United States Patent [19]

Habermeier et al.

[11] 4,174,455

[45] Nov. 13, 1979

[54] ANTHRANILATES OF OXYALKYLATED CARBOXAMIDES

[75] Inventors: Jürgen Habermeier, Pfeffingen; Roland Moser, Basel; Wolfgang Seiz, Pfeffingen, all of Switzerland

[73] Assignee: Ciba-Geigy Corporation, Ardsley, N.Y.

[21] Appl. No.: 966,417

[22] Filed: Dec. 4, 1978

[30] Foreign Application Priority Data

Dec. 9, 1977 [CH] Switzerland ............ 15123/77

[51] Int. Cl.$^2$ .............. C07C 101/54; C08G 59/54
[52] U.S. Cl. ........................... 560/49; 528/64; 528/68; 528/123; 528/341; 528/361; 528/365
[58] Field of Search .......................... 560/49

[56] References Cited

U.S. PATENT DOCUMENTS

| | | | |
|---|---|---|---|
| 3,123,631 | 3/1964 | Staiger et al. ............ | 560/50 |
| 3,271,440 | 9/1966 | Thomas .................. | 560/50 |
| 4,129,741 | 12/1978 | Schmidt et al. .......... | 560/50 |

Primary Examiner—James O. Thomas, Jr.
Assistant Examiner—G. T. Breitenstein
Attorney, Agent, or Firm—Joseph F. DiPrima

[57] ABSTRACT

Anthranilates of the formula

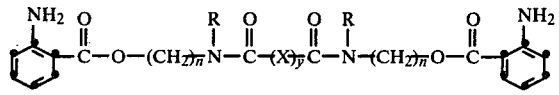

wherein each R is hydrogen or

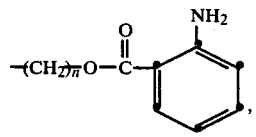

each n is the number 2, 3 or 4, y is nought or 1 and X is an alkylene radical having 1 to 8 C atoms, meta- or para-phenylene or meta- or para-cyclohexylene, are obtained by reacting a hydroxyalkylated dicarboxylic acid diamide of the formula

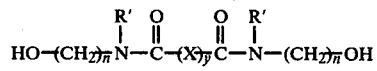

wherein each R is hydrogen or $+CH_2)_{\overline{n}}OH$ and n, y and X are as defined above, with isatoic anhydride, preferably in the presence of an alkaline catalyst.

The novel compounds are valuable chain extenders and crosslinking agents for the production of polyurethanes and polyurea resins and are also suitable as curing agents for epoxide resins.

9 Claims, No Drawings

ANTHRANILATES OF OXYALKYLATED CARBOXAMIDES

The present invention relates to novel anthranilates of oxyalkylated dicarboxylic acid diamides, processes for their preparation and their use as chain extenders and crosslinking agents in the production of polyurethanes and polyureas.

4,4'-Methylene-bis-(o-chloroaniline) (MOCA) has for a long time been one of the best chain extenders and crosslinking agents introduced into polyurethane and polyurea technology, since MOCA, especially in the production of polyurethane elastomers or flexible foams, has advantageous processing characteristics in respect of the reactivity and, moreover, imparts outstanding mechanical properties to the crosslinked polymers. As is known, however, there is a suspicion that MOCA may be carcinogenic (cf. "Elastomerics," March 1977, page 37) and there has been no lack of attempts to replace MOCA by crosslinking agents which are equivalent in respect of the advantageous processing characteristics and end characteristics of the polymers.

In Technical Bulletin 152 of the "Sherwin-Williams Company" (USA), bis-anthranilates of linear aliphatic diols are mentioned. In "Elastomerics," March 1977, page 37 et seq., 4,4'-methylene-bis-anthranilates are proposed as a replacement for MOCA. Furthermore, in the two Belgian Patent Specification Nos. 847,680 and 847,681, bis-anthranilates of diols containing a N-N-heterocyclic radical, for example 1,3-di-(2'-hydroxyethyl)-benzimidazolone and 1,3-di-(2'-hydroxyethyl)-5,5-dimethylhydantoin, are disclosed as chain lengtheners for polyurethanes.

It has now been found that when anthranilates of oxyalkylated dicarboxylic acid diamides are used as chain extenders and crosslinking agents in urethane and urea formulations, elastomers are obtained which have mechanical properties which are improved in some cases.

The present invention thus relates to novel anthranilates of the formula I

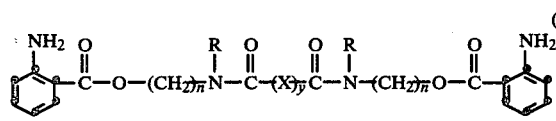

in which the Rs are each a hydrogen atom or

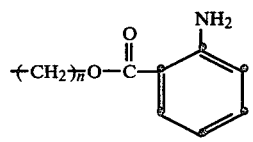

n in each case is the number 2, 3 or 4, y is nought or 1 and X is an alkylene radical having 1 to 8 C atoms, meta- or para-phenylene or meta- or para-cyclohexylene.

Preferably, in the formula I, the Rs are each a hydrogen atom, n is in each case 2, y is nought or 1 and X is ethylene, butylene, octylene, meta- or para-phenylene or para-cyclohexylene.

The anthranilates of the oxyalkylated aliphatic dicarboxylic acid diamides, in particular N,N'-bis-(anthranoyloxyethyl)-oxalic acid diamide, are of particular interest.

The compounds of the formula I can be prepared by reacting hydroxyalkylated dicarboxylic acid diamides of the formula II

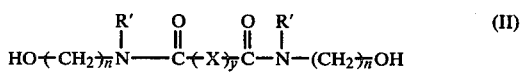

in which the R's are each a hydrogen atom or $-(CH_2)_n-OH$ and n, y and X are as defined in formula I, with isatoic anhydride, preferably in the presence of an alkaline catalyst, to give compounds of the formula I.

The starting materials used in this process are preferably compounds of the formula II in which the R's are each a hydrogen atom, n is in each case 2, y is nought or 1 and X is ethylene, butylene, octylene, meta- or para-phenylene or para-cyclohexylene.

In particular, N,N'-bis-(2-hydroxyethyl)-oxalic acid diamide is used as the compound of the formula II.

The compounds of the formula II are known compounds and can be prepared by the process described in "Journal of American Chemical Society," volume 73 (1951), 5,557 et seq., by transesterifying the dicarboxylic acid diesters of the formula $R_1-O-OC-(X-)_y CO-O-R_1$, in which $R_1$ is preferably a lower alkyl group, with the corresponding alkanolamines and dialkanolamines, such as ethanolamine, propanolamine, butanolamine, diethanolamine, dipropanolamine and dibutanolamine, and distilling off the alcohol formed during the transesterification.

When preparing the compounds, according to the invention, of the formula I, the starting materials are generally employed in approximately stoichiometric amounts. Preferably, however, a slight stoichiometric excess of isatoic anhydride is used, i.e. when preparing diesters of the formula I in which R is a hydrogen atom, up to 2.2 mols of isatoic anhydride are employed per 1 mol of the di-(hydroxyalkyl)-dicarboxylic acid diamides of the formula II, and when preparing the tetraesters of the formula I, up to 4.4 mols of isatoic anhydride are used per 1 mol of the tetrahydroxyalkyl compound of the formula II.

The preparation of the compounds of the formula I is preferably carried out in the presence of an organic solvent or solvent mixture. Suitable solvents are, in particular, the aprotic solvents, such as dioxan, chloroform, toluene, dimethylformamide and dimethylacetamide.

The reaction temperature for the preparation of the compounds of the formula I can be from 30° to 160° C. Preferably, the reaction is carried out in the temperature range of 50° to 130° C.

Preferably, the conversion reaction is catalysed by bases, and alcoholates, including those of the starting diols, alkali metal hydroxides or alkaline earth metal hydroxides, tertiary amines and ammonium bases or other substances having a basic action can be used. Frequently, basic impurities in the starting materials also suffice. Catalysts can be used in amounts of 0.01 to 10 mol%, based on the amount of isatoic anhydride emloyed.

The reaction of isatoic anhydride with alcohols, which, as is known, proceeds with the elimination of $CO_2$, is described in detail in U.S. Pat. No. 3,123,631.

Another process for the preparation of the compounds of the formula I comprises esterifying 1 mol of the compound of the formula II with 2 or 4 mols of o-nitrobenzoic acid and then reducing the nitro groups in a known manner to the amino groups.

The compounds of the formula I can also be prepared by a transesterification process, by transesterifying the hydroxyalkyl compounds of the formula II with anthranilates, preferably alkyl anthranilates having 1 to 4 C atoms in the alkyl group, the alcohol formed during the reaction being distilled off.

The compounds according to the invention are colourless crystalline substances or viscous liquids which dissolve readily in many organic solvents, such as dioxan, toluene, benzene, dichlorobenzene and dimethylformamide. Furthermore, the novel compounds also have good solubility in higher molecular weight diols, diol-ether compounds, short-chain polyesters containing hydroxyl groups and polycaprolactone.

As mentioned initially, the compounds according to the invention are a valuable replacement for 4,4'-methylene-bis-(o-chloroaniline). They can therefore be used in an analogous manner. In particular, the compounds according to the invention are suitable as chain extenders in polyurethanes and as crosslinking agents for the preparation of polyurea resins.

The novel anthranilates of the formula I can also be used as amine curing agents for epoxide resins.

EXAMPLE 1

Dianthranilate of N,N'-bis-(2-hydroxyethyl)-oxalic acid diamide 400 ml of toluene and 170 ml of N,N'-dimethylformamide (DMF) are initially introduced into a laboratory reactor fitted with a stirrer, a thermometer, a reflux condenser, external heating and cooling and a feed device for pulverulent material. 52.9 g (0.3 mol) of N,N'-bis-(2-hydroxyethyl)-oxalic acid diamide and 0.2 g of sodium hydroxide powder are added, with stirring. The suspension is stirred at 80° C. and 102.8 g (0.63 mol) of isatoic anhydride are added in 6 portions in the course of 5 hours. A further 0.2 g of sodium hydroxide powder is added after 2 hours and after 5 hours. The reaction proceeds with the elimination of $CO_2$. After the final addition of isatoic anhydride, the mixture is stirred for a further 4 hours at 80° C. and the reaction solution is cooled to 20° C., whereupon a large proportion of the reaction product precipitates in the form of colourless crystals. The mother liquor is concentrated in order to obtain the residual amount of the desired product. A total of 121.4 g (97.6% of theory) of the product is obtained. For purification, this product is recrystallised from 500 ml of dioxan/acetone (1:1). This yields 99.7 g (80.2% of theory) of colourless crystals which melt at 173.5°–175° C.

Combustion analysis gives, for $C_{20}H_{22}N_4O_6$

| found: | calculated: |
|---|---|
| 57.75% C | 57.97% C |
| 5.65% H | 5.35% N |
| 13.30% N | 13.53% N |

The IR and H-NMR spectra further confirm that the desired product has the following formula:

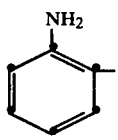—C—O—CH$_2$—CH$_2$—NH—CO—CO—NH—CH$_2$—CH$_2$—O—C—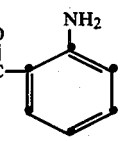

EXAMPLE 2

Tetra-anthranilate of N,N,N',N'-tetra-(2-hydroxyethyl)-oxalic acid diamide

A mixture of 500 ml of toluene, 250 ml of dimethylformamide and 61 g (0.25 mol) of N,N,N',N'-tetra-(2-hydroxyethyl)-oxalic acid diamide is stirred at room temperature in a glass apparatus which has a capacity of 1.5 liters and is fitted with a stirrer, a thermometer, a reflux condenser and a heating bath. 0.3 g of finely powdered potassium hydroxide is added and the mixture is warmed to 60° C., with stirring. 65.3 g of isatoic anhydride are now added all at once and the reaction starts immediately with the evolution of $CO_2$. After 2 hours at 60° C., a further 65.3 g (0.4 mol) of isatoic anhydride are added and the temperature is now raised to 80° C. After one hour at 80° C., a further 65.3 g of isatoic anhydride are added and the temperature is raised to 100° C., with stirring. The reaction mixture is stirred at 100° C. for a further 2½ hours, 5.5 g of active charcoal are added and the resulting mixture is cooled to 20° C. and filtered. The clear, pale yellow solution is concentrated completely and the residue is then dried to constant weight at 150° C. and 0.2 mm Hg. This yields 186 g (100% of theory) of the desired product in the form of a brown resin.

For purification, the product is dissolved in 2 liters of ethanol (80° C.) and the solution is cooled to room temperature. The product which has precipitated is dissolved in dimethylformamide (300 ml) and precipitated in 3 liters of water. After drying, this yields 110 g (59.4% of theory) of a product which softens at 68°–70° C. The (60 Mc) H-NMR spectrum is in accord with the structure given below. The elementary analysis also confirms the structure for $C_{38}H_{40}N_6O_{10}$:

| found: | calculated: |
|---|---|
| 62.10% C | 61.61% C |
| 5.40% H | 5.44% H |
| 11.76% N | 11.35% N |

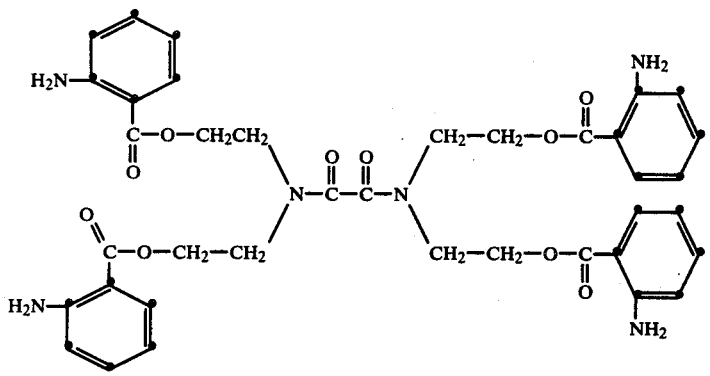

EXAMPLE 3

Bis-anthranilate of N,N'-bis-(2-hydroxyethyl)-isophthalic acid diamide

2 Liters of toluene and 1.2 liters of dimethylformamide are initially introduced into a stirred apparatus of 6 liters capacity. 756.8 g (3.0 mols) of N,N'-bis-(2-hydroxyethyl)-isophthalic acid diamide (melting point=145°–147° C.) are added. This mixture is warmed to 80° C., with stirring, and 2.40 g of sodium hydroxide powder and 340 g of isatoic anhydride are added. After a few minutes, the reaction starts with vigorous evolution of $CO_2$. After one hour, a further 2.40 g of sodium hydroxide powder and 340 g of isatoic anhydride are added. After a further 1.5 hours at 80° C., a further 2.4 g of sodium hydroxide and then 351 g of isatoic anhydride are added and the mixture is stirred for a further 3 hours at 80° C. The total amount of isatoic anhydride added is thus 1,030 g (6.32 mols). After 3 hours at 180° C., the reaction mixture is stirred for a further 4 hours at 100° C. and cooled to room temperature. The mixture is filtered and the clear, yellowish-brown solution is concentrated to dryness. 5 Liters of methanol are added to the product, which crystallises slowly, whilst this is still warm, and the whole is mixed and cooled. The crystal slurry is isolated by suction filtration, the crystals are filtered off with strong suction and washed with methanol. The crystals are dried for 24 hours at 100° C./20 mm Hg and the desired product is obtained in good purity and in 83.2% yield (1,225 g).

The colourless crystalline product melts at 165°–167° C. The NMR and IR spectra are in accord with the structure given below.

Elementary analysis gives, for $C_{26}H_{26}N_4O_6$:

EXAMPLE 4

Bis-anthranilate of N,N'-bis-(2-hydroxyethyl)-terephthalic acid diamide

The procedure followed is similar to that described in Example 3, 227.04 g (0.9 mol) of N,N'-bis-(2-hydroxyethyl)-terephthalic acid diamide (melting point=230°–232° C.) being suspended in a mixture of 750 ml of toluene and 350 ml of dimethylformamide and this suspension being warmed to 80°–83° C., with stirring. 0.7 g of sodium hydroxide powder and 108.32 g of isatoic anhydride are then added (evolution of $CO_2$). After one hour, a further 0.7 g of sodium hydroxide is added as the catalyst and a further 100 g of isatoic anhydride are stirred in. 2 hours later, a further 0.7 g of sodium hydroxide and 100 g of isatoic anhydride (total thus 308.32 g=1.89 mols) are added. The reaction mixture is stirred for a further 2 hours at 80° C. and then for a further 3 hours at 100° C.

On cooling, the desired reaction product precipitates out as crystals. The resulting crystal slurry is diluted with 400 ml of acetone, cooled to 15° C. and then filtered off with strong suction. The product is washed with 150 ml of acetone and dried and this yields 312 g (70.6% of theory) of the bis-anthranilate with a melting point of 218°–220° C. The product can be used in this form for the intended purpose. If a product of analytical purity is to be obtained, 300 g of the said substance can be recrystallised from a mixture of 3.5 liters of dioxan and 0.85 liter of dimethylformamide. This yields (from 300 g) 266.7 g of colourless crystals with a melting point of 222°–223° C. The (60 Mc) H-NMR spectrum is in accord with the structure given below.

Elementary analysis gives, for $C_{26}H_{26}N_4O_6$:

|  | found: | calculated: |
|---|---|---|
|  | 63.64% C | 63.66% C |
|  | 5.40% H | 5.34% H |
|  | 14.41% N | 14.42% N |

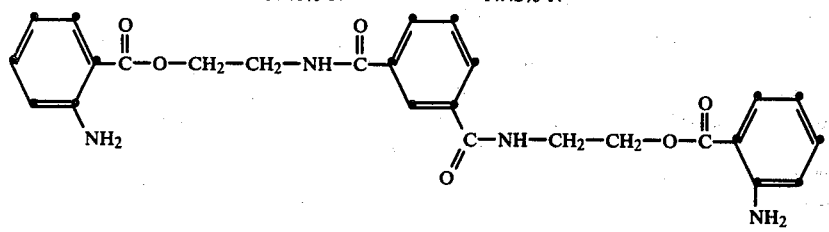

| found: | calculated: |
|---|---|
| 63.65% C | 63.66% C |
| 5.35% H | 5.34% H |
| 11.50% N | 11.42% N |

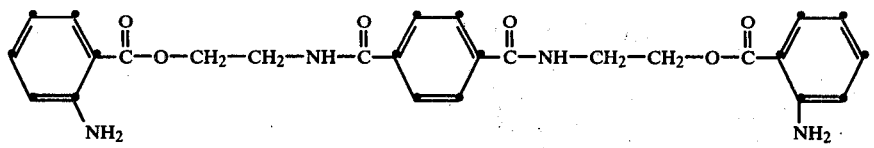

EXAMPLE 5

Bis-anthranilate of N,N'-bis-(2-hydroxyethyl)-succinic acid diamide

Analogously to Example 4, 183.8 g (0.9 mol) of N,N'-bis-(2-hydroxyethyl)-succinic acid diamide (melting point=156° C.) are reacted with 308.32 g (1.89 mols) of isatoic anhydride (addition made in 3 portions). The reaction is carried out in a mixture of 775 ml of toluene and 360 ml of dimethylformamide under the catalytic action of 2.1 g of sodium hydroxide powder. As described precisely in Example 4, the reaction takes place at 80°–110° C. in the course of a total of 7.5 hours. Working up of the cooled (20° C.), clear, pale brown reaction mixture is effected first by distilling off the solvents and all volatile constituents at 120° C./14 mm Hg. The crude product is obtained in the form of a crystalline melt in quantitative yield.

For purification, the product is recrystallised from acetone/water (1:1). This yields 253.9 g (63.76% of theory) of colourless crystals with a melting point of 154°–156° C.

Elementary analysis, and also the (60 Mc) H-NMR spectrum, confirms the structure given below.

| found: | calculated: |
|---|---|
| 59.70% C | 59.72% C |
| 6.00% H | 5.92% H |
| 12.63% N | 12.66% N |

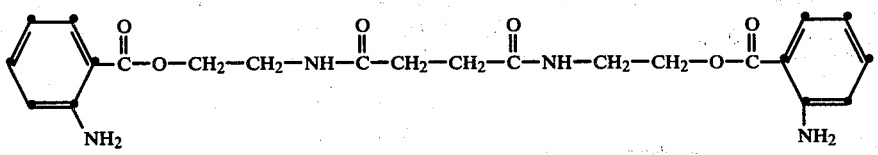

EXAMPLE 6

Bis-anthranilate of N,N'-bis-(2-hydroxyethyl)-adipic acid diamide 68.68 g (0.3 mol) of N,N'-bis-(2-hydroxyethyl)-adipic acid diamide are mixed together with 170 ml of toluene, 170 ml of dimethylacetamide and 0.25 g of sodium hydroxide powder in a stirred apparatus and the mixture is stirred at 80° C. 102.8 g (0.63 mol) of isatoic anhydride are added in 6 portions over a period of 7 hours, the intervals between the additions always being the same; a further 0.25 g of sodium hydroxide powder is added with the 3rd and with the 5th portion.

After the final addition of isatoic anhydride, the mixture is allowed to react for a further 4 hours at 80° C. and is then cooled to room temperature. The clear solution is concentrated to dryness at 100° C./15 mm Hg. The crude bis-anthranilate is obtained in quantitative yield in the form of a pale brown crystal mass. For purification, the product is recrystallised from 600 ml of ethanol (95% pure) and the pure product is obtained in 66.7% yield (94.3 g). The melting point is 144°–145° C.

A further 5.7 g of the pure product can be obtained from the mother liquor by concentrating to 270 ml.

The (60 Mc) H-NMR spectrum is in accord with the structure given below. Combustion analysis gives, for $C_{24}H_{30}N_4O_6$:

| found: | calculated: |
|---|---|
| 61.24% C | 61.26% C |
| 6.42% H | 6.43% H |
| 11.91% N | 11.91% N |

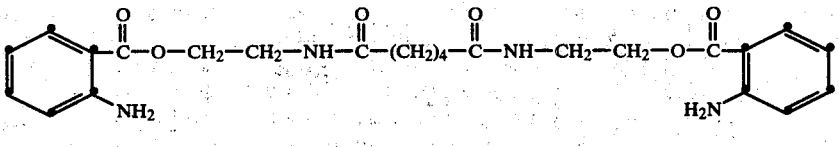

EXAMPLE 7

Bis-anthranilate of N,N-bis-(2-hydroxyethyl)-trans-cyclohexane-1,4-dicarboxylic acid diamide In the manner described in Example 6, 25.8 g (0.1 mol) of N,N'-bis-(2-hydroxyethyl)-trans-cyclohexanedicarboxylic acid diamide (melting point=249°–251° C.) are reacted with 34.9 g (0.21 mol) of isatoic anhydride in 6 portions. The reaction is carried out analogously to Example 6, over a period of 7 hours, in 55 ml of toluene and 55 ml of dimethylformamide, using 0.3 g of sodium hydroxide powder (in 3 portions) as the catalyst. The hot, clear solution is filtered and the filtrate is cooled to 20° C., whereupon some of the product crystallises out as a colourless, crystalline powder. The filtrate is concentrated completely and a further 41.5 g of product are obtained (total amount 51.6 g).

The two amounts together (51.6 g) are recrystallised from a mixture of 1 liter of dioxan, 0.1 liter of ethanol and 50 ml of dimethylformamide.

The desired product is obtained in the form of colourless crystals (23.6 g=47.6% of theory), which melt at 228.8°–229.2° C. The thin layer chromatogram shows that the product contains no impurities and the (60 Mc) H-NMR spectrum is in accord with the structure given below.

Combustion analysis gives, for $C_{26}H_{32}N_4O_6$:

| found: | calculated: |
|---|---|
| 62.84% C | 62.89% C |
| 6.52% H | 6.49% H |
| 11.24% N | 11.28% N |

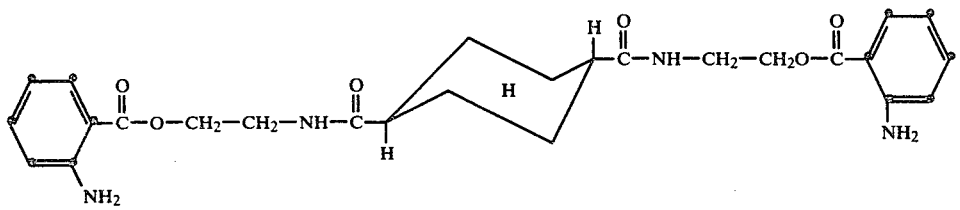

EXAMPLE 8

Bis-anthranilate of N,N'-bis-(2-hydroxyethyl)-sebacic acid diamide

The procedure followed for the preparation of this bis-anthranilate is the same as that described in Example 6. 86.5 g (0.3 mol) of N,N'-bis-(2-hydroxyethyl)-sebacic acid diamide in 240 ml of toluene and 200 ml of dimethylformamide are reacted, over a period of 7 hours, under the catalytic action of 0.7 g of sodium hydroxide powder (added in 4 portions at intervals spread over the total reaction time), with 102.8 g (0.63 mol) of isatoic anhydride (added in 6 portions at intervals spread over the total reaction time).

The mixture is then warmed at 100° C. for a further 1.5 hours and the clear reaction mixture is concentrated to dryness. The desired product is obtained in quantitative yield as the crude substance in the form of a pale brown, clear, highly viscous resin.

For purification, the product is recrystallised from a mixture of 450 ml of ethanol (95% pure) and 35 ml of acetone.

The pure product is obtained in 74.9% yield (118.2 g) in the form of fine, colourless crystals with a melting point of 122.5°–124.5° C.

The (60 Mc) H-NMR spectrum is in accord with the corresponding structural formula.

Combustion analysis also shows that the desired product has been obtained; the following values are obtained for $C_{28}H_{38}N_4O_6$:

| found: | calculated: |
|---|---|
| 63.94% C | 63.86% C |
| 7.30% H | 7.27% H |
| 10.72% N | 10.64% N |

USE EXAMPLES

Example A

A prepolymer is prepared from 50 g of a low molecular weight polyester of adipic acid and ethylene glycol, which has hydroxyl end groups and a OH number of 55 (available commercially under the trade name "Desmophen 2000") and which has previously been freed from traces of water by heating (for 3 hours at 130° C.) in vacuo (0.5 mm Hg), and 25.0 g of 4,4'-diisocyanato-diphenylmethane (available commercially under the name "Desmodur 44 V"), by stirring for 30 minutes at 110° C.

A mixed melt of 30 g of "Desmophen 2000" and 10.3 g of the product prepared according to Example 1 (dissolved at 140° C. to give a clear solution and then cooled to about 100° C.) is stirred into this prepolymer, which is still at about 100° C.

This casting resin mixture is poured into aluminium moulds with a wall thickness of 4 mm and is cured completely at 140° C. in the course of 5 hours. This yields an elastomer moulding with excellent mechanical properties.

Examples B to F

The bis-anthranilates according to the invention listed in Table 1 were added to, in each case, 100 parts of a liquid prepolymer which has been obtained from toluylene diisocyanate and polytetramethylene glycol and has an isocyanate content of 1.5 equivalents/kg and a viscosity of about 10,000 mPa.s at 25° C. (available commercially under the name "Adipren L-167") and the components were mixed in the ratios and under the processing conditions indicated in Table 1. The mixtures obtained after intimate mixing were freed in vacuo from the air stirred in and then poured into aluminium moulds, pre-treated with mould-release agents, to produce sheets with dimensions of 135×135×4 mm and 135×135×1 mm and then crosslinked under the conditions indicated in Table 1.

Test pieces which correspond to DIN 53,455, No. 4 were stamped out from the 4 mm thick sheets using a punch and the tests to determine the tensile strength and elongation at break were carried out on these. The remainder of the 4 mm sheet was used for determining the Shore A hardness (DIN 53,505) and the impact resilience according to DIN 53,455.

Shaped pieces for determining the tear propagation resistance according to DIN 53,363 were cut out from the 1 mm thick sheet. The results obtained are listed in Table 1.

Table 1

Processing conditions and end characteristics of the curable isocyanate mixtures

| Examples | | B | C | D | E | F | Comparison 1 | Comparison 2 |
|---|---|---|---|---|---|---|---|---|
| Crosslinking agent (diamine) | | according to Example 1 | according to Example 3 | according to Example 5 | according to Example 6 | according to Example 8 | bis-anthranilate of neopentyl-glycol* | MOCA |
| parts | | 24.8 | 33.1 | 29.8 | 28.2 | 31.6 | 25.1 | 16 |
| Processing conditions (°C.) | Prepolymer | 100 | 90 | 90 | 70 | 80 | 80 | 80 |
| | Crosslinking agent | 170 | 140 | 160 | 140 | 125 | 80 | 120 |
| Crosslinking conditions (hours/°C.) | | 6/100 | | | 6/120 | | | |
| Appearance of the elastomer | | yellow, transparent | brown, opaque | brown, transparent | yellow, opaque | pale yellow, transparent | brown, transparent | yellow, opaque |
| Shore A hardness (units) | | 94 | 95 | 89 | 82 | 75 | 61 | 92 |
| Impact resilience (%) | | 25 | 22 | 21 | 21 | 18 | 8 | 26 |
| Tear propagation resistance (N/mm) | | 121 | 140 | | 72 | 61 | 27 | 100 |
| Tensile strength (N/mm$^2$) | | 15 | 50.6 | 53 | 45 | 40 | 17.8 | 42 |
| Elongation at break (%) | | 500 | 363 | 448 | 383 | 363 | 640 | 333 |

*Bis-anthranilate of neopentylglycol (of. German Auslegeschrift 2,040,644)

Examples G to L

A liquid, unmodified epoxide resin, based on bisphenol A, with an epoxide content of 5.4 equivalents/kg and a viscosity of about 10,000 mPa.s at 25° C. was mixed in equivalent ratios with the bis-anthranilates according to the invention and the mixtures were melted together under the conditions indicated in Table 2.

4 g amounts of the mixtures thus obtained were poured into small aluminium dishes about 5 cm in diameter. The glass transition temperature of the moulded material obtained after curing was then determined using a thermoanalyzer (type "TA 2000" from Mettler, Greifensee, Switzerland).

A further portion of resin/curing agent mixture was applied to a glass plate and cured in an oven in accordance with the data in Table 2. The chemical stability of the film thus obtained was determined, the procedure being as follows:

The appearance of the film is described briefly (visual). One drop of each of the particular chemicals is then left on the film for 1 hour. After this period of action, the chemicals are wiped off and the surface of the film graded visually, grade 1 being given for no visible attack, grade 2 for slight attack and grade 3 for severe attack on the surface of the film and grade 4 being given for complete destruction of the film.

Table 2

Processing conditions and end characteristics of the curable epoxide resin mixtures

| Examples | G | I | J | K | L |
|---|---|---|---|---|---|
| Curing agent (diamine) according to | Example 1 | Example 2 | Example 3 | Example 4 | Example 6 |
| Parts per 100 parts of epoxide resin | 55.9 | 50 | 66.2 | 66.2 | 63.5 |
| Processing conditions | resin and curing agent mixed at 160° C. | resin and curing agent mixed at about 70° C. | resin and curing agent mixed at 150° C. | resin and curing agent mixed at 180° C. | resin and curing agent mixed at 130° C. |
| Curing conditions (hours/°C.) | 8/140 | 8/140 and 6/180 | 8/140 | 8/140 | 8/140 |
| Appearance of the casting | brown | dark brown | light brown | yellow | yellow |
| Glass transition temperature (°C.) | 92 | 96 | 100 | 109 | 90 |
| Appearance of the lacquer films | yellow with high gloss | dark brown with high gloss | dark yellow with high gloss | yellow with high gloss | pale yellow with high gloss |
| Chemical stability in: 5N H$_2$SO$_4$ | 1 | 1 | 1 | 1 | 1 |
| 5N NaOH | 1 | 1 | 1 | 1 | 1 |
| H$_2$O | 1 | 1 | 1 | 1 | 1 |
| chlorobenzene | 2 | 2 | 2 | 1 | 1 |

What is claimed is:

1. An anthranilate of the formula I (I)

-continued

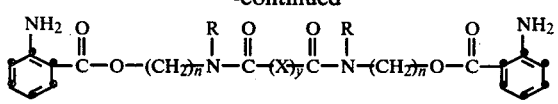

wherein each R is hydrogen or

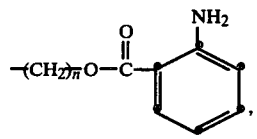

each n is the number 2, 3 or 4, y is nought or 1 and X is an alkylene radical having 1 to 8 C atoms, meta- or para-phenylene or meta- or para-cyclohexylene.

2. A compound as claimed in claim 1, which is N,N'-bis-(anthranoyloxyethyl)-oxalic acid diamide.

3. A compound as claimed in claim 1, which is N,N,N',N'-tetra-(anthranoyloxyethyl)-oxalic acid diamide.

4. A compound as claimed in claim 1, which is: N,N'-bis-(anthranoyloxyethyl)-succinic acid diamide.

5. A compound as claimed in claim 1, which is N,N'-bis-(anthranoyloxaethyl)-adipic acid diamide.

6. A compound as claimed in claim 1, which is N,N'-bis-(anthranoyloxyethyl)-sebacic acid diamide.

7. A compound as claimed in claim 1, which is N,N'-bis-(anthranoyloxyethyl)-isophtalic acid diamide.

8. A compound as claimed in claim 1, which is N,N'-bis-(anthranoyloxyethyl)-terephthalic acid diamide.

9. A compound as claimed in claim 1, which is N,N'-bis-(anthranoyloxyethyl)-trans-cyclohexanedicarboxylic acid diamide.

* * * * *